United States Patent
Jukes et al.

(10) Patent No.: US 9,964,963 B2
(45) Date of Patent: May 8, 2018

(54) PRESSURE EQUALIZING INSERT

(71) Applicant: BELIMO HOLDING AG, Hinwil (CH)

(72) Inventors: Andrew James Jukes, Wetzikon (CH); Urs Keller, Hinwil (CH)

(73) Assignee: BELIMO HOLDING AG, Hinwil (CH)

( * ) Notice: Subject to any disclaimer, the term of this patent is extended or adjusted under 35 U.S.C. 154(b) by 0 days. days.

(21) Appl. No.: 14/893,323

(22) PCT Filed: Jun. 11, 2014

(86) PCT No.: PCT/EP2014/001584
§ 371 (c)(1),
(2) Date: Nov. 23, 2015

(87) PCT Pub. No.: WO2014/198412
PCT Pub. Date: Dec. 18, 2014

(65) Prior Publication Data
US 2016/0124441 A1    May 5, 2016

(30) Foreign Application Priority Data
Jun. 12, 2013 (CH) ..................... 1104/13

(51) Int. Cl.
*G05D 16/10* (2006.01)
*F16K 5/06* (2006.01)
(Continued)

(52) U.S. Cl.
CPC ......... *G05D 16/103* (2013.01); *F16K 5/0605* (2013.01); *G05D 16/0608* (2013.01);
(Continued)

(58) Field of Classification Search
CPC ............. F16K 5/0605; F24D 19/1015; G05D 16/0655; G05D 16/103; G05D 7/0106; Y10T 137/7788; Y10T 137/7791
(Continued)

(56) References Cited

U.S. PATENT DOCUMENTS 2,004,869 A * 6/1935 Hogg ..................... F02M 69/00
                                                        123/405
2,011,393 A * 8/1935 Bradley ................... B67D 7/48
                                                        137/459
(Continued)

FOREIGN PATENT DOCUMENTS

WO     01/13017 A2    2/2001
WO   2011154003 A2   12/2011

OTHER PUBLICATIONS

International Search Report for PCT/EP2014/001584 dated Nov. 13, 2014 [PCT/ISA/210].
(Continued)

*Primary Examiner* — William McCalister
(74) *Attorney, Agent, or Firm* — Sughrue Mion, PLLC (57) ABSTRACT

The invention relates to a pressure equalizing insert (1) which is provided for installation in a valve (10) for regulating a fluid stream in particular in a HVAC system. The pressure equalizing insert (1) comprises a housing (2) having an actuating member (3) which is movably mounted thereon and is configured to at least partially guide the fluid stream regulated by the valve (10) and, when the pressure equalizing insert (1) is installed, co-operates with a valve seat (15) depending upon a pressure difference prevailing in the fluid stream in order to regulate the fluid stream. The invention further relates to a valve (10) having an installed pressure equalizing insert (1), wherein the pressure equal- (Continued)

izing insert (1) can be inserted in particular as a pre-assembled assembly into the valve (10).

16 Claims, 7 Drawing Sheets

(51) Int. Cl.
*G05D 16/06* (2006.01)
*G05D 7/01* (2006.01)
*F24D 19/10* (2006.01)

(52) U.S. Cl.
CPC ....... *F24D 19/1015* (2013.01); *G05D 7/0106* (2013.01); *Y10T 137/7788* (2015.04); *Y10T 137/7791* (2015.04)

(58) Field of Classification Search
USPC .................................................. 137/501, 503
See application file for complete search history.

(56) References Cited

U.S. PATENT DOCUMENTS

| | | | | |
|---|---|---|---|---|
| 2,011,476 A * | 8/1935 | Eastman | ................ | F22D 11/00 137/505.3 |
| 2,035,151 A * | 3/1936 | Eches | ................ | G05D 16/0697 137/458 |
| 2,211,068 A * | 8/1940 | McDonald | ............. | B03B 5/623 137/206 |
| 2,415,106 A * | 2/1947 | Modugno | ............... | F28B 11/00 137/42 |
| 2,772,068 A * | 11/1956 | Grove | ................... | F16K 3/246 251/210 |
| 2,775,253 A * | 12/1956 | Engel | ..................... | G05B 6/05 137/82 |
| 2,959,392 A * | 11/1960 | Von Platen | ............ | F16K 1/422 251/332 |
| 2,995,057 A * | 8/1961 | Nenzell | ................ | F16B 33/004 251/332 |
| 3,051,196 A * | 8/1962 | Miller | .................. | F16K 15/063 137/515.5 |
| 3,263,961 A * | 8/1966 | Varga | ....................... | F16K 1/42 251/332 |
| 3,272,218 A * | 9/1966 | Johnson | ................... | F16K 1/46 137/102 |
| 3,640,501 A * | 2/1972 | Walton | ............... | F04B 53/1027 137/533.25 |
| 3,882,723 A * | 5/1975 | Wickham | ............... | B60T 13/26 137/501 |
| 3,890,999 A | 6/1975 | Moskow | | |
| 4,074,693 A * | 2/1978 | Kates | ..................... | G05D 7/014 137/454.6 |
| 4,210,171 A * | 7/1980 | Rikuta | ................. | G05D 7/0106 137/501 |
| 4,493,338 A * | 1/1985 | Petursson | ............... | F16K 27/02 137/454.2 |
| 4,770,206 A * | 9/1988 | Sjoberg | ............... | F04B 53/1027 137/516.29 |
| 5,143,116 A * | 9/1992 | Skoglund | ............ | G05D 7/0126 137/487 |
| 5,234,025 A * | 8/1993 | Skoglund | ............ | G05D 7/0126 137/497 |
| 5,642,752 A * | 7/1997 | Yokota | ................ | G05D 7/0106 137/413 |
| 5,806,557 A * | 9/1998 | Helge | ..................... | F15B 21/06 137/501 |
| 5,875,815 A | 3/1999 | Ungerecht et al. | | |
| 5,971,012 A * | 10/1999 | Skoglund | ............ | G05D 7/0133 137/501 |
| 6,135,142 A * | 10/2000 | Yokota | .................... | F16K 31/12 137/486 |
| 6,932,107 B2 * | 8/2005 | Kirchner | ............. | F16K 31/363 137/501 |
| 7,156,120 B2 * | 1/2007 | Cherfane | ............. | G05D 7/0133 137/504 |
| 7,401,622 B2 * | 7/2008 | Ungerecht | ......... | G05D 16/0655 137/315.04 |
| 7,621,461 B2 * | 11/2009 | Trantham | ............ | G05D 23/022 236/100 |
| 7,735,514 B2 * | 6/2010 | Marstorp | ................ | F16K 1/526 137/501 |
| 7,770,595 B2 * | 8/2010 | Kirchner | ............... | G05D 7/014 137/501 |
| 8,628,032 B2 * | 1/2014 | Feith | .................... | A01G 25/023 239/542 |
| 9,052,715 B2 * | 6/2015 | Kirchner | ............. | G05D 7/0126 |
| 2002/0179724 A1 * | 12/2002 | Moesby | ............... | G05D 23/023 236/23 |
| 2003/0192597 A1 * | 10/2003 | Trantham | ............ | F25B 41/062 137/501 |
| 2005/0039797 A1 * | 2/2005 | Carlson | ................ | G05D 7/0106 137/494 |
| 2007/0284004 A1 | 12/2007 | Ungerecht | | |

OTHER PUBLICATIONS

Written Opinion for PCT/EP2014/001584 dated Nov. 13, 2014 [PCT/ISA/237].

* cited by examiner

PRESSURE EQUALIZING INSERT

CROSS REFERENCE TO RELATED APPLICATIONS

This application is a National Stage of International Application No. PCT/EP2014/001584, filed on Jun. 11, 2014, which claims priority from Swiss Patent Application No. 01104/13, filed on Jun. 12, 2013, the contents of all of which are incorporated herein by reference in their entirety.

TECHNICAL FIELD

The invention relates to a pressure equalizing insert which is provided for installation in a valve for regulating a fluid stream in particular in an HVAC system.

PRIOR ART

Valves for HVAC systems (HVAC: heating, ventilation and air conditioning) are known from the prior art. Such valves have a first valve device for regulating a fluid stream, wherein a constant pressure difference over the first valve device is ensured with a second valve device. Such valves are advantageous in central heating systems in particular and prevent a negative effect on the pressure over the valve of a heating element due to consumption of the fluid stream for other heating elements.

WO 2004/107075 discloses a valve for an HVAC system, in which the first valve device is arranged in a first part of the housing and the second valve device is arranged in the second part of the housing, wherein the first part and the second part of the housing are connected to one another. Such a valve is relatively compact and needs only a relatively small installation space.

DE 198 24 630 discloses a combination of an axial membrane regulator for the volume flow or differential pressure regulation of liquids and gases. A throttle, a regulating valve and a volume flow regulator are installed, one after the other, in the direction of flow in a closed housing. The valve seat of the throttle and the valve seat of the regulating valve are arranged at opposite ends of the same flow passage. The throttle is secured by a nut to prevent it from twisting. An internal valve bore in the housing of the valve connects the inlet opening and the membrane chamber from the membrane of the regulating valve. The pressure from the central opening acts on the membrane through the pulse bore. The membrane is held on the housing of the valve against a spring force and includes the movable valve plate. The medium flows through the valve seat and valve plate in the volume flow regulator.

Valves having a plurality of valve devices have a relatively complex design. Accordingly, it is also relatively complicated to manufacture such valves.

DESCRIPTION OF THE INVENTION

One object of the present invention is to create a pressure equalizing insert, which is provided for installation in a valve for regulating a fluid flow, in particular an HVAC system and which reduces or prevents at least certain disadvantages of the prior art. One object of the present invention is in particular to create a pressure equalizing insert, which is provided for installation in a valve for regulating a fluid flow of an HVAC system in particular and which simplifies production of the valve.

According to the present invention, these goals are achieved by the elements of the independent claims. Additional advantageous embodiments are also derived from the dependent claims and the description.

A pressure equalizing insert, which is provided for installation in a valve for regulating a fluid flow in an HVAC system in particular, comprises a housing with an actuating member displaceably mounted thereon, which is equipped to at least partially guide the fluid flow regulated by the valve and to cooperate with a valve seat to regulate the fluid flow as a function of a pressure difference prevailing in the fluid flow when a pressure equalizing insert is installed. The pressure equalizing insert comprises a housing and can be arranged quickly and easily in the valve. The valve seat may be arranged on the pressure equalizing insert or on the valve. The pressure equalizing insert comprises the functionalities required for pressure equalization and can be prefabricated completely in a fabrication environment that is particularly suitable for this purpose. The fabrication environment is characterized by specialized tools, cleanliness, etc., for example, and therefore permits efficient production of the pressure equalizing insert.

In one embodiment, the actuating member is arranged between an inlet opening and an outlet opening of the housing, such that the actuating member is displaced relative to the valve seat in accordance with a pressure difference between the pressure of a fluid flow carried in the pressure equalizing insert and the pressure of a fluid flow carried outside of the pressure equalizing insert for cooperation with the valve seat. Such a pressure equalizing insert makes available functionalities for guiding the fluid flow as well as functionalities for equalizing the pressure and is therefore particularly suitable for installation in a valve.

In one embodiment, the actuating member is held displaceably by a membrane, wherein the membrane divides a cavity in the housing into an interior fluid region and an exterior fluid region, wherein the interior fluid region is fluidically connected to the fluid stream guided by the actuating member, wherein the fluid region assigned to the exterior is fluidically connected to an exterior region of the housing, wherein the actuating member is prestressed by a spring element and the prevailing displacement of the actuator member results from a pressure difference between a pressure in the interior fluid region and a pressure in the fluid region assigned to the exterior. In a robust and long-lived embodiment, such a pressure equalizing insert provides functionality that when installed in a valve it provides the pressure equalization.

In one embodiment, the housing and the actuating member are designed to be essentially cylindrical. The pressure equalizing insert is particularly suitable for installation in valves, which are usually designed to be essentially cylindrical.

In one embodiment, the housing has a plurality of housing parts, which can be connected to one another with one or more connecting devices. The components of the pressure equalizing insert are therefore easily accessible and the pressure equalizing insert can therefore be manufactured easily. The connecting devices may be screw connections, press seats, oil-seal rings, etc.

In one embodiment, one or more limiting devices are provided to limit the displacement of the actuating member relative to the valve seat. The displacement of the actuating member can be limited in the direction of the valve seat and/or in the opposite direction. The limiting devices may be arranged in a passage in the pressure equalizing insert in which the actuating member is guided. The limiting device may be designed to hold the actuating member in the pressure equalizing insert, so that no additional holding means for the actuating member are necessary. This simplifies the installation of the pressure equalizing insert into a valve. The limiting device may be designed to limit the displacement of the actuating member in the direction of the valve seat and thus to prevent the actuating member from damaging the valve seat. This improves the lifetime of the valve.

In one embodiment, a sealing element is mounted between the housing and the actuating member at the inlet end. The sealing element prevents the fluid flow from being able to penetrate between the housing and the actuating member.

In one embodiment, a membrane has one or more corrugated embossings to secure the actuating member. The displaceability of the actuating member is thereby facilitated and greater displacement is also made possible in particular.

In one embodiment, the housing has a first section, which, with the installed pressure equalizing insert, is equipped for sealing with respect to the valve housing, and the housing has a third section, which is equipped to establish a fluid connection in the form of a clearance between the housing and the housing of the valve when the pressure equalizing insert has been installed, wherein the clearance provides a fluid connection to the fluid region assigned to the exterior. The diameter of the first section, for example, is larger than the diameter of the third section, so that the pressure equalizing insert is suitable for installation in a valve having a cylindrical receiving region for the pressure equalizing insert. The clearance between the housing of the pressure equalizing insert and the housing of the valve is designed to be narrow enough in particular, wherein damping of the membrane and/or of the actuating member is achieved due to the narrow clearance between the pressure equalizing insert and the valve housing. The susceptibility to soiling is also reduced in particular when the narrow clearance is long enough. In one variant, a second section is installed between the first section and the third section to establish a fluid connection between the fluid region assigned to the outlet end and the exterior of the housing of the pressure equalizing insert, such that the fluid connection opens into the fluid connection designed in the form of a clearance between the housing and the valve and the housing of the pressure equalizing insert. Alternatively or additionally, damping of the membrane and/or of the actuating member can be achieved by appropriate dimensioning of the fluid connection. In one variant, the diameter of the third section is larger than the diameter of the second section, which may in turn be smaller than the diameter of the third section. The pressure equalizing insert is therefore particularly suitable for installation in a valve having a cylindrical receiving region for the pressure equalizing insert.

In one embodiment variant, the fluid region assigned to the outlet is fluidically connected to the exterior of the housing through one or more openings in the wall of the housing. The openings may be in the form of radial bores in a cylindrical segment of the housing. For small openings, this leads to damping of the movement of the actuating member and/or the membrane of the pressure equalizing insert. Supplying pressure at the outlet end into the pressure equalizing insert is simplified due to this design of the valve housing.

One embodiment variant has a peripheral groove for receiving a sealing element which is equipped to form a seal with a housing of the valve when the pressure equalizing insert has been installed at the inlet end on a first section of the housing. With the pressure equalizing valve inserted, the sealing element cooperates with a housing part of the valve and thus prevents the fluid stream entering at the inlet end from being able to flow around the pressure equalizing insert and thus the fluid flow is completely guided inside the actuating member.

In one embodiment variant, an annular groove for receiving a sealing insert for a valve element of the valve is mounted on a third section of the housing. The sealing insert is held in the annular groove and at the same time is correctly positioned with respect to the valve element.

In one embodiment variant, the actuating member has a lip-shaped region. The lip-shaped region is formed in particular on the inlet end of the actuating member. The lip-shaped region has a flange-shaped design. The lip-shaped region causes the forces acting on the actuating member to be independent of the pressure on the inlet end and therefore the flow through a valve, in which such a pressure equalizing insert has been installed, is independent of the pressure at the inlet end.

In addition to a pressure equalizing insert, the invention relates to a valve for regulating a fluid flow of an HVAC system in particular having an installed pressure equalizing insert which pressure equalizing insert can be inserted into the valve in particular as a preassembled module. Such a valve can be manufactured rapidly and inexpensively.

In one embodiment variant, a clearance is formed between the housing of the pressure equalizing insert and a housing of the valve, this clearance being provided for establishing a fluid connection to the fluid region of the pressure equalizing insert assigned to the exterior and is designed to reduce penetration of dirt into the pressure equalizing insert and/or to induce hydraulic damping of the movement of the actuating member of the pressure equalizing. Such a valve has particularly favorable and long-lived properties due to the damping of the actuating member and due to the reduction in the risk of soiling.

In one embodiment variant, a first valve housing part is set up to receive a valve element and the pressure equalizing insert, wherein a first valve housing part for securing the pressure equalizing insert in the first valve housing part is set up, wherein the first and the second valve housing parts are set up so that an operative connection can be established between the first and the second valve housing parts. The operative connection can be established as a screw connection, a press fit, etc., for example. Such a valve can be manufactured rapidly and inexpensively.

According to another aspect of the invention, a pressure equalizing insert is provided for installation in a valve for regulating a fluid flow in an HVAC system in particular. The pressure equalizing insert comprises a housing having an actuating member mounted displaceably therein, said actuating member being equipped to at least partially guide the fluid flow regulated by the valve. The actuating member has a lip-shaped region, whose dimensions cause the flow rate of the fluid flow guided in the actuating member to be independent of the pressure at the inlet end. Therefore, this improves the operation of a valve in which the pressure equalizing insert is installed. The dimensions are determined experimentally in particular. In one variant, the effective size of the lip-shaped region is essentially of the same order of magnitude as the wall thickness of the actuating member.

In one embodiment variant, the actuating member is equipped to cooperate with a valve seat to regulate the fluid flow as a function of a pressure difference prevailing in the fluid flow when the pressure equalizing insert has been installed.

In one embodiment variant, the actuating member is arranged between an inlet opening and an outlet opening of the housing, such that the actuating member is displaced relative to the valve seat for cooperation with the valve seat in accordance with the pressure difference between the pressure of the fluid flow guided in the pressure equalizing insert and the pressure of the fluid flow guided outside of the pressure equalizing insert.

In one embodiment variant, the actuating member is held displaceably by a membrane, wherein the membrane divides a cavity of the housing into an interior fluid region and a fluid region assigned to the exterior, wherein the interior fluid region is fluidically connected to the fluid stream guided by the actuating member, wherein the fluid region assigned to the exterior is fluidically connected to an exterior region of the housing, wherein the actuating member is prestressed by a spring element and the prevailing displacement of the actuating member is based on the pressure difference between the pressure in the interior fluid region and the pressure in the fluid region assigned to the exterior.

In one embodiment variant, the housing and the actuating member are designed to be essentially cylindrical.

In one embodiment variant, the housing has a plurality of housing parts, which can be connected to one another with one or more connecting devices.

In one embodiment variant, one or more limiting devices, which limit the displacement of the actuating member in relation to the valve seat, are provided.

In one embodiment variant, a sealing element is mounted at the inlet end between the housing and the actuating member.

In one embodiment variant, a membrane for holding the actuating member has one or more corrugated embossings.

In one embodiment variant, the housing has a first section, which is equipped for sealing with respect to a housing of the valve when the pressure equalizing insert has been installed. The housing also has a third section, which is equipped to establish a fluid connection in the form of a clearance between the housing and the housing of the valve when the pressure equalizing insert is installed. The clearance makes available a fluid connection to the fluid region assigned to the exterior.

In one embodiment variant, the fluid region assigned to the exterior is fluidically connected to the exterior of the housing by means of one or more openings in a wall of the housing.

In one embodiment variant, a first section of the housing has a peripheral groove at the inlet end to receive a sealing element, which is equipped for sealing with respect to a housing of the valve when the pressure equalizing insert is installed.

In one embodiment variant, a third section of the housing has an annular groove on the outlet end for receiving a sealing insert for a valve element of the valve.

In addition to the pressure equalizing insert, the additional aspect of the invention relates to a valve for regulating a fluid stream, in particular in an HVAC system with an installed pressure equalizing insert according to the additional aspect of the invention, wherein this pressure equalizing insert can be inserted into the valve as a preassembled module in particular.

In one embodiment variant, a clearance is formed between the housing of the pressure equalizing insert and a housing of the valve, wherein this clearance is provided for establishing a fluid connection to the fluid region of the pressure equalizing insert assigned to the exterior and is designed so that the penetration of soil into the pressure equalizing insert is reduced and/or hydraulic damping of the movement of the actuating member of the pressure equalizing insert is induced.

In one embodiment variant, a first valve housing part is equipped to accommodate a valve element and the pressure equalizing insert, wherein a second valve housing part is equipped for securing the pressure equalizing insert in a first valve housing part, wherein the first and second valve housing parts are equipped so that an operative connection between the first and second valve housing parts can be established.

BRIEF DESCRIPTION OF THE DRAWINGS

On the basis of figures, which show only exemplary embodiments, the invention is explained below, showing.

MEANS FOR IMPLEMENTING THE INVENTION

Figure 1A:
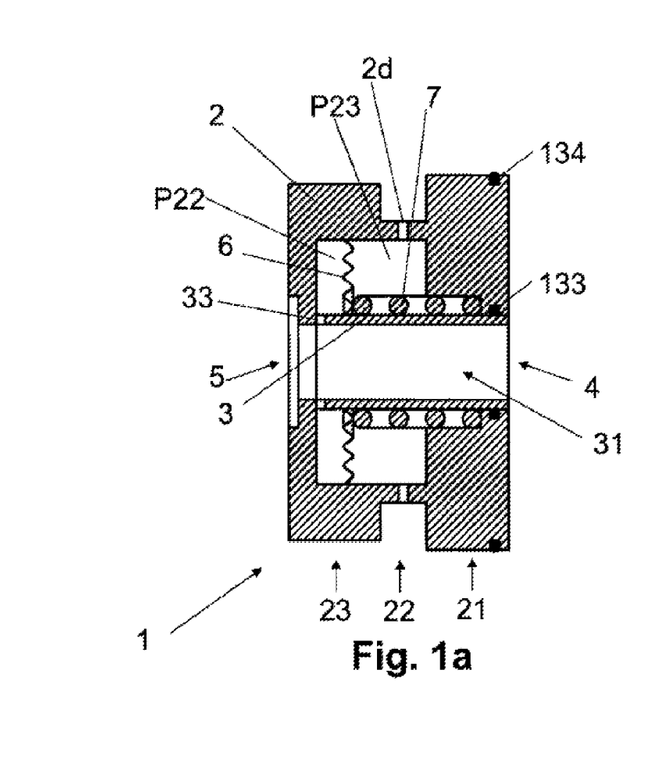
FIG. 1a shows schematically a cross section through a first embodiment of a pressure equalizing insert.

FIG. 1a shows schematically a cross section through a first embodiment of a pressure equalizing insert 1 according to the invention. The pressure equalizing insert 1 is provided for installation in a first embodiment of a valve 10, shown schematically in FIG. 2, for regulating a fluid stream of an HVAC system. The fluid stream is in particular a liquid stream, e.g., a hot water stream or a cold water stream of the HVAC system. The pressure equalizing insert 1 has a housing 2, in which the essential components of the pressure equalizing insert 1 are accommodated. The housing 2 is made of metal, for example, stainless steel, brass, etc.

As shown in FIG. 1a, the housing 2 is designed as a cylindrical body with axial symmetry. The housing 2 is shown schematically in one piece in FIG. 1a, but the housing 2 is constructed of several parts in order to be able to accommodate the essential components of the pressure equalizing insert 1 in the housing 2, wherein the several parts are held together by connecting means such as threads, spring rings, press fits, etc. The several parts of the housing 2 comprise, for example, a cylindrical housing body as well as a disk-shaped housing cover.

A displaceable actuating member 3 is arranged in a passage in the housing 2, which is between an inlet opening 4 and an outlet opening 5 of the housing 2. The passage and the actuating member 3 are designed with axial symmetry. The actuating member 3 is made of a hollow cylinder or sleeve and consists of one of the materials listed above in conjunction with the description of the housing 2.

The actuating member 3 is equipped for guiding 31 a fluid stream and for cooperating with a valve seat 15, depending on the prevailing displacement of the actuating member 3. The valve seat 15 is mounted on the valve 10, for example, for which the pressure equalizing insert 1 is provided for installation (cf. FIG. 2). In one variant, the valve seat 15 is mounted on the pressure equalizing insert 1. The actuating member 3 has a sufficiently large open cross section for guiding 31 the fluid stream.

As shown in FIG. 1a, the actuating member 3 is held displaceably by a membrane 6, wherein the membrane 6 divides a cavity in the housing 2 into an interior fluid region P22 and a fluid region P23 assigned to the exterior. As can be seen in FIG. 1a, the membrane 6 is designed in a disk shape, wherein the actuating member 3 is mounted on the inside circumference of the membrane 6, and the outside circumference of the membrane 6 is attached to the housing 2 inside the cavity. The membrane 6 has one or more corrugated embossings, i.e., the cross section of the membrane 6 is corrugated. The mobility of the membrane 6 is therefore increased and thus the displacement of the actuating member 3 is facilitated. The membrane 6 is manufactured of any flexible material.

The interior fluid region P22 of the cavity in the housing 2 is fluidically connected to the fluid stream carried in the actuating member 3 by way of actuating member passages 33. Thus, the same pressure prevails in the interior fluid region P22 of the cavity of the housing 2 as in the fluid stream carried through the actuating member 3.

The actuating member passages 33 may be embodied as grooves or slots provided on the circumference of the actuating member 3. In one alternative embodiment variant, the actuating member passages 33 are formed only by the area between the circumference of the actuating member 3 and the housing 2, which does not have any sealant and is therefore permeable for a fluid. The fluid connection between the fluid stream and the actuating member 3 and the interior fluid region P22 may be formed in any other manner.

The fluid region P23 assigned to the exterior of the cavity in the housing 2 is fluidically connected to an exterior region of the housing 2 by means of housing openings 2d. Thus, the same pressure prevails in the fluid region P23 assigned to the exterior of the cavity of the housing 2 as on the exterior of the housing 2.

The housing openings 2d may be embodied as boreholes provided at regular intervals on the circumference of the housing 2. The fluidic connection between the exterior region of the housing 2 and the fluid region P23 assigned to the exterior may be formed in any other way.

As diagramed schematically in FIG. 1a, a spring 7 is arranged on the circumference of the actuating member 3 between the membrane 6 and the housing 2. The actuating member 3 is forced in the direction of the outlet opening 5 of the housing 2 by the spring force.

At the outlet end, the inside diameter of the outlet opening 5 matches the inside diameter of the actuating member 3, and the outside diameter of the actuating member 3 is larger than the inside diameter of the outlet opening 5, thus forming a limiting device, which prevents the actuating member 3 from being displaced farther than into the position shown in FIG. 1a due to the spring force in the direction of the outlet opening 5.

Figure 1B:
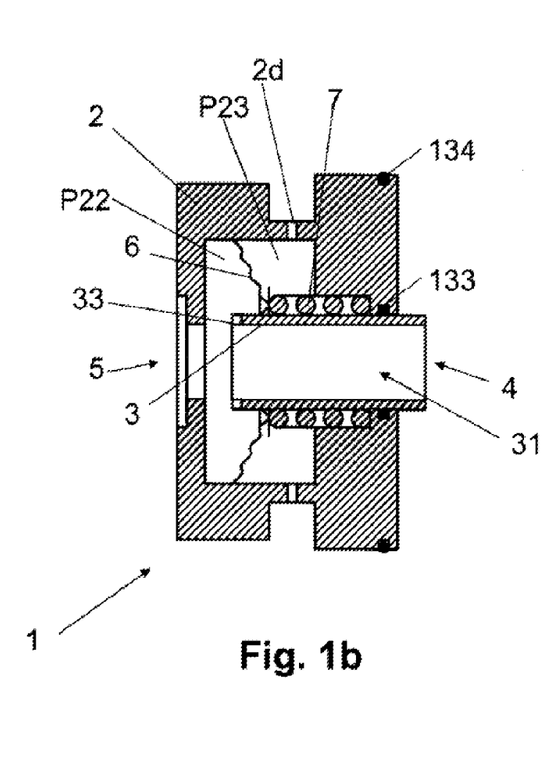
FIG. 1b shows schematically a cross section through a first embodiment of a pressure equalizing insert, wherein the actuating member is displaced relative to the valve seat.

At the inlet end, the outside diameter of the inlet opening 4 is larger than the outside diameter of the actuating member 3, so that the actuating member 3 can be displaced out of the housing 2, as diagramed schematically in FIG. 1b—against the spring force.

The extent of the displacement out of the housing 2 is derived from the spring force of the spring 7 and the pressure difference between the pressure in the interior fluid region P22 of the cavity of the housing 2, and the pressure in the fluid region P23 of the cavity of the housing 2 assigned to the exterior. This pressure difference is obtained during operation with the pressure equalizing insert 1 installed in the valve 10. The membrane 6 separates the interior fluid region P22 from the fluid region P23 assigned to the exterior and is displaced according to the pressure difference prevailing between the interior fluid region P22 and the fluid region P23 assigned to the exterior. Since the membrane 6 is fastened onto the actuating member 3, the displacement of the membrane 6 is transmitted to the actuating member 3, which is thus displaced accordingly.

The pressure equalizing insert 1, which is provided for installation in a valve of an HVAC system, can be prefabricated completely in isolation from the valve of the HVAC system. This fabrication may take place in a specialized fabrication environment having the required technical facilities, which permit in particular a precise, permanent and efficient configuration of the membrane 6 and the spring 7. The specialized fabrication environment can be constructed in accordance with the requirements as stipulated and may comprise, for example, a closed space, so that the requirements made of it, such as cleanliness of the fabrication environment, etc. can be achieved inexpensively.

The pressure equalizing insert 1 may comprise only the actuating member 3, which is provided for cooperation with a valve seat 15 arranged separately from the pressure equalizing insert 1. In assembly of the valve 10, an adjustment between the actuating member 3 and the valve seat 15 may optionally be necessary. Alternatively, the valve seat 15 may also be mounted on the pressure equalizing insert 1, so that in assembly of the valve 10, no further adjustments are needed between the actuating member 3 and the valve seat 15.

Figure 2:
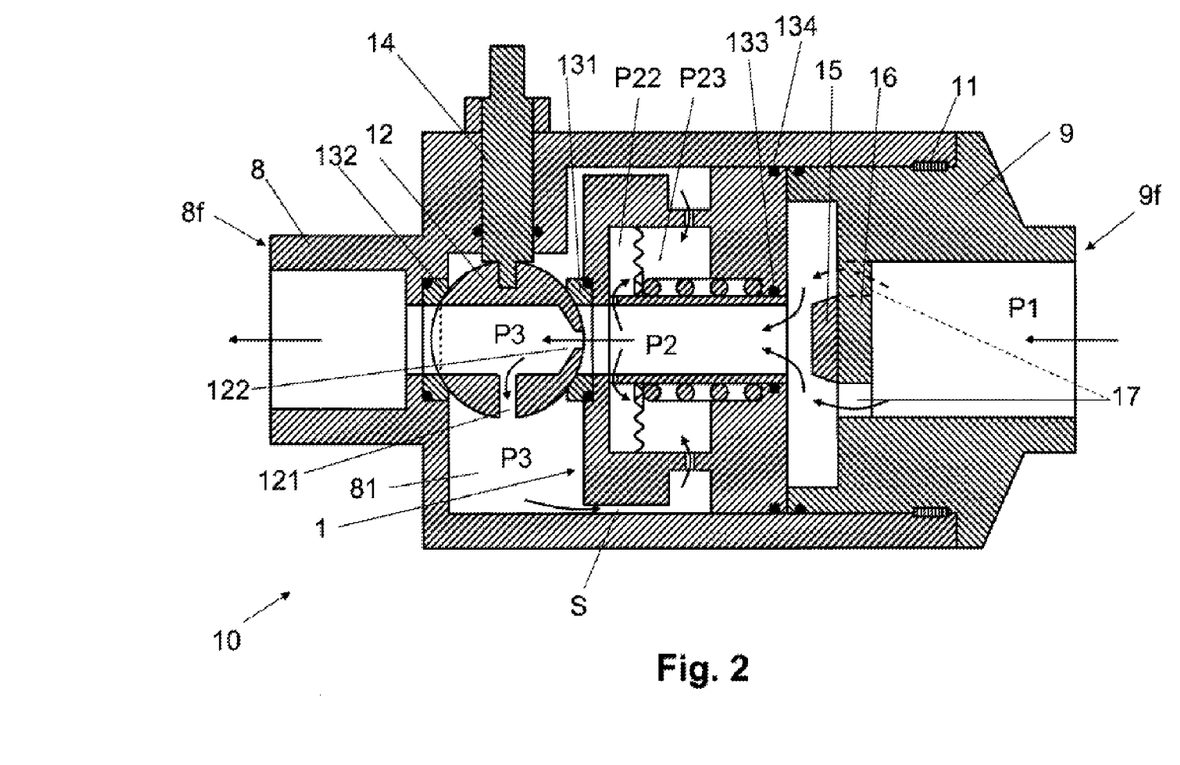
FIG. 2 shows schematically a first embodiment of a valve with an installed first embodiment of a pressure equalizing insert.

FIG. 2 shows schematically a first embodiment of a valve 10 for an HVAC system containing a first embodiment of a pressure equalizing insert 1, as described above.

As shown in FIG. 2, the valve 10 includes a first valve housing part 8 and a second valve housing part 9, each of which has a flange 8f, 9f to arrange the valve on the pipe ends of an HVAC system, wherein the respective flange 8f, 9f has a thread, for example. The valve 10 is equipped to regulate a fluid stream of the HVAC system carried in these pipes. The valve housing parts 8, 9 are designed to be at least partially axially symmetrical.

As shown in FIG. 2, the second valve housing part 9 is inserted into the first valve housing part 8, wherein a thread 11 is provided to establish an operative connection between the two valve housing parts 8, 9, i.e., to screw them directly to one another. The valve housing parts 8, 9 may of course also be connected to one another in any other way.

The first valve housing part 8 is equipped to accommodate a valve element 12 together with the respective sealing elements 131, 132 as well as the pressure equalizing insert 1. The valve element 12 is designed to be spherical, for example.

The valve element 12 has a groove for engaging with a protrusion on a valve adjusting element 14 which is held rotatably on the first valve housing part 8 and out of which the first valve housing part 8 is guided. The valve element 12 can be adjusted by means of the valve adjusting element 14 and therefore the fluid stream flowing through the valve 10 can be adjusted.

The valve element 12 has at the inlet end an aperture 122, which creates a pressure drop as a function of the position of the valve element 12 in the fluid stream. At the inlet end of the aperture, the fluid stream has the pressure P2, and at the outlet end of the aperture, the fluid stream has the pressure P3.

The second valve housing part 9 has a valve seat 15, which is provided for cooperating with the actuating member 3 of the pressure equalizing insert 1. The valve seat 15 is mounted on a carrier 16 in the fluid stream on the inlet end, the carrier having recesses 17 through which the fluid stream can flow from the first valve housing part 9 into the actuating member 3 of the pressure equalizing insert 1. At the inlet end, the fluid stream in the second valve housing part 9 has a pressure P1.

As shown in FIG. 2, the valve element 12 has a passage 121, which leads into a cavity 81 of the first valve housing part 8. Thus the same pressure P3 prevails in the cavity 81 as in the valve element 12. The outer diameter of the concentrically designed pressure equalizing insert 1 on the outside and on the inside as well as the inside diameter of the first valve housing part 8 are coordinated with one another, so that there is a fluid connection between the cavity 81 of the first valve housing part 8 and the housing openings 2*d* in the pressure equalizing insert 1 on the outlet end of the pressure equalizing insert 1, whereas on the inlet end the pressure equalizing insert 1 is in fluid-tight connection to the first valve housing part 8.

Thus, the same pressure peak 3 prevails in the valve element 12 as in the fluid region P23 assigned to the exterior of the pressure equalizing insert 1 in the valve 10 shown in FIG. 2, and the same pressure P2 prevails in the passage of the actuating member 3 as in the interior fluid region P22 of the pressure equalizing insert 1. As already described above, because of the displacement of the membrane 6 due to the pressure difference and the spring force of the spring element, the displacement of the actuating member 3, which is fastened onto the membrane 6 relative to the valve seat 15 is obtained. If the pressure P2 in the actuating member 3 is now greater than the pressure P3 in the valve element 12, then the actuating member 3 is displaced in the direction of the valve seat 15, so that there is a greater drop in pressure between the pressure P1 on the inlet end and the pressure in the actuating member P2 because of the reduced passage in the valve seat 15. This results in a constant pressure difference across the valve element 12.

The valve 10 diagramed schematically in FIG. 2 can be manufactured easily, as described below, by assembling the individual parts. First, the valve actuating element 14 is inserted into the first valve housing part 8. Then the valve element 12 and the sealing elements 131, 132 are inserted. Next the pressure equalizing insert 1 is inserted, and finally the second valve housing part 9 is inserted into the first valve housing part 8 and screwed onto it, wherein the components of the valve 10, i.e., in particular the valve element 12, the sealing elements 131, 132 and the pressure equalizing insert 1 are held in the valve 10 because of the screw connection.

Figure 3:
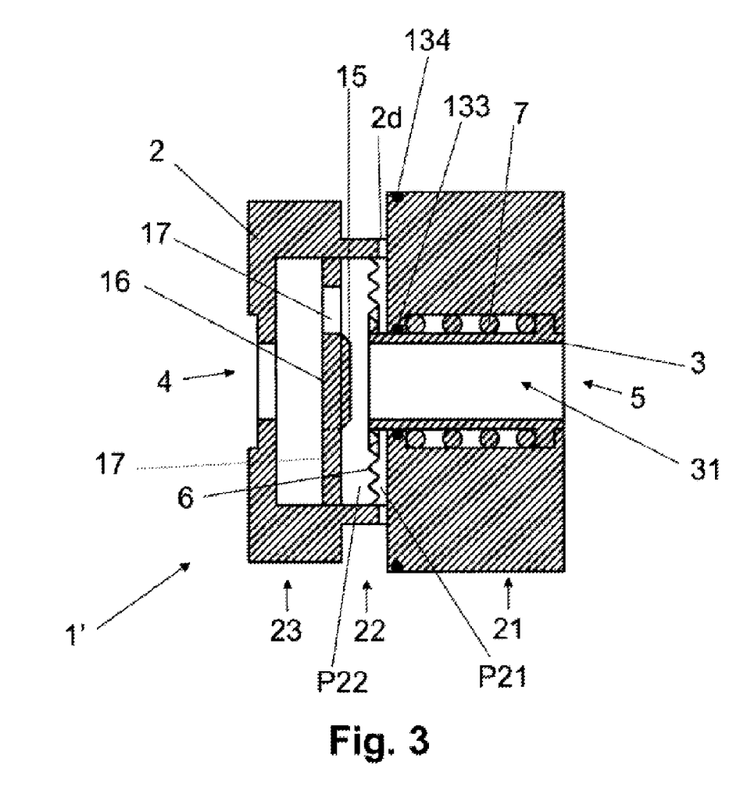
FIG. 3 shows schematically a cross section through a second embodiment of a pressure equalizing insert.

FIG. 3 shows schematically a second embodiment of a pressure equalizing insert 1' with which the inlet opening 4 and the outlet opening 5 are reversed, in contrast with the first embodiment of a pressure equalizing insert 1. An actuating member 3 is arranged between the inlet opening 4 and the outlet opening 5. Furthermore, a valve seat 15 is arranged between the inlet opening 4 and the outlet opening 5. The pressure equalizing insert 1' in turn has a housing 2, which accommodates the components of the pressure equalizing insert 1'.

The valve seat 15 is mounted on a carrier 16 on the inlet end. The carrier 16 has recesses 17 through which a fluid stream can pass.

As shown in FIG. 3, the actuating member 3 is held by a membrane 3, which separates an interior fluid region P22 from a fluid region P21 assigned to the exterior. The interior fluid region P22 is fluidically connected to the inlet opening 4 via the recesses 17. The fluid region P21 assigned to the exterior is fluidically connected to the exterior of the pressure equalizing insert 1' via openings 2*d*.

The actuating member 3 is equipped to at least partially guide a fluid stream. Thus, a fluid stream entering the inlet opening 4 is guided through the recesses 17 of the carrier 16 and via the actuating member 3 to the outlet opening 5.

The actuating member 3 is displaceably mounted on the housing 2 of the pressure equalizing insert 1'. A spring element 7 mounted between a protrusion on the housing and a protrusion on the actuating member 3 causes the actuating member 3 to be forced in the direction of the outlet opening, wherein a limiting device is provided as shown schematically in FIG. 3, so that the actuating member 3 is held in the pressure equalizing insert 1'.

A pressure difference between the interior fluid region P22 and the fluid region P21 assigned to the exterior is transmitted by membrane 6 to the actuating member 3 which cooperates with the valve seat 15 in accordance with the pressure difference. For example if the pressure in the fluid region P21 assigned to the exterior is greater than the pressure in the interior fluid region P22 then the actuating member 3 is forced in the direction of the valve seat 15 against the spring force of the spring element 7, wherein due to the cooperation between the actuating member 3 and the valve seat 15 the pressure drop in the fluid stream is increased. This results in a constant pressure difference across the valve element 12 with a valve 10' as described below having a valve element 12 and an installed pressure equalizing insert 1'.

The first embodiment of the pressure equalizing insert 1 according to FIGS. 1*a*, 1*b* and the second embodiment of the pressure equalizing insert 1' have a first section 21 of the housing, a second section 22 of the housing and a third section 23 of the housing. The first section 21 of the housing is provided for cooperating with a housing of the valve 10, 10' in which the pressure equalizing insert 1, 1' is installed. The second section of the housing is provided for forming a fluid connection to the fluid region P23, P21 assigned to the exterior. The third section is provided to form a clearance between the pressure equalizing insert 1, 1' and the housing of the valve 10, 10' in which the pressure equalizing insert 1, 1' is installed. For example the cylindrical first section 21 has a diameter which is larger than the diameter of the cylindrical third section 23, which is in turn larger than the diameter of the cylindrical second section 22. Such embodiments of pressure equalizing inserts 1, 1' are suitable in particular for valves 10, 10', which have cylindrical receiving regions for the respective pressure equalizing insert 1, 1'.

Figure 4:
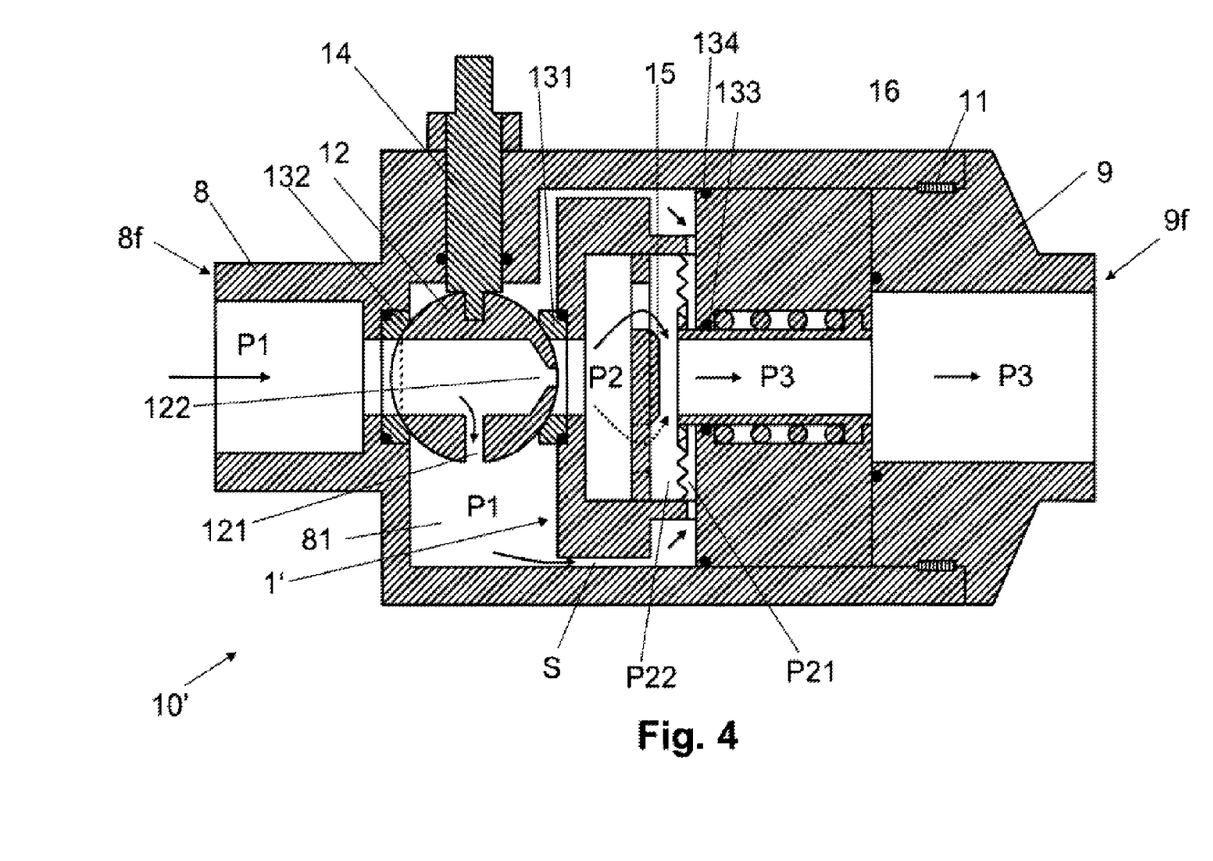
FIG. 4 shows schematically a second embodiment of a valve with an installed second embodiment of a pressure equalizing insert.

FIG. 4 shows schematically a second embodiment of a valve 10' for an HVAC system which contains a second embodiment of pressure equalizing insert 1' as described above. The valve 10' in turn comprises a valve element 12 with an aperture 122 and a passage 121 as well as a valve actuating element 14. Furthermore, the valve 10' has a first valve housing part 8 and a second valve housing part 9, which can be screwed together via a screw connection 11.

In comparison with the first embodiment of a valve 10 shown in FIG. 2, the inlet region and the outlet region have been switched in the second embodiment shown in FIG. 4. The flange 8f of the first valve housing part 8 in FIG. 4 is assigned to the inlet region, and the flange 9f of the second valve housing part 9 is assigned to the outlet region of the valve 10'.

A fluid stream regulated by the valve 10' flows at pressure P1 into the valve 10' on the inlet end with the flange 8f of the first valve housing part 8 and leaves the valve on the outlet end at flange 9f of the second valve housing part 9 at a pressure P3. A pressure drop occurs due to the aperture 122 of the actuating member 12, so that the fluid stream, which is conveyed further after the aperture 122, is at a pressure P2. The pressure drop depends on the position of the actuating member 12 and/or of the aperture 122, respectively. The fluid stream is guided into the pressure equalizing insert 1' downstream from the aperture 122 of the actuating element 12. The fluid stream first flows through the recesses 17 in the carrier 16, on which the valve seat 15 is held. The fluid stream flows next through the actuating member 3. The fluid stream is guided at a pressure P3 in the actuating member 3. The pressure drop between the pressure P2 and the pressure P3 depends on the position of the actuating member 3 and/or the cooperation of the actuating member 3 with the valve seat 15, respectively. This yields a constant pressure difference across the valve element 12.

In the first and second embodiments of the valve 10, 10', the clearance S between the pressure equalizing insert 1, 1' and the valve 10, 10' leads to a damping action for the membrane 6 and/or the actuating member 3 respectively if the clearance is small enough. Furthermore, even if it is not particularly small, the clearance S leads to a reduction in the risk of soiling in the exterior region of the pressure equalizing insert 1, 1' and in the fluid region P23, P21 assigned to the exterior. In addition or as an alternative to a damping action of the clearance S, the damping action can be achieved for the membrane 6 and/or the actuating member 3 by suitable dimensions of the housing openings 2d.

The clearance S between the pressure equalizing insert 1, 1' and the valve 10, 10' may be provided as a completely peripheral clearance. The pressure equalizing insert 1, 1' in this case is supported with respect to the valve 10, 10' exclusively in the first section 21 of the pressure equalizing insert 1, 1'. Alternatively, the clearance S may be formed by clearance segment or clearance boreholes, so that the pressure equalizing insert 1, 1' is also supported with respect to the valve 10, 10' in the third section 23 of the pressure equalizing insert 1, 1'.

As can be seen in FIG. 2 and FIG. 4, sealing element 133 may be arranged at the inlet end between the actuating member 3 and the housing 2 of the pressure equalizing insert 1, 1'. Furthermore, another sealing element 135 may be provided at the inlet end between the housing 2 of the pressure equalizing insert 1, 1' and the first valve housing part 8 of the valve 10, 10'. The sealing elements 133, 134 improve the sealing effect between the respective components.

Figure 5A:
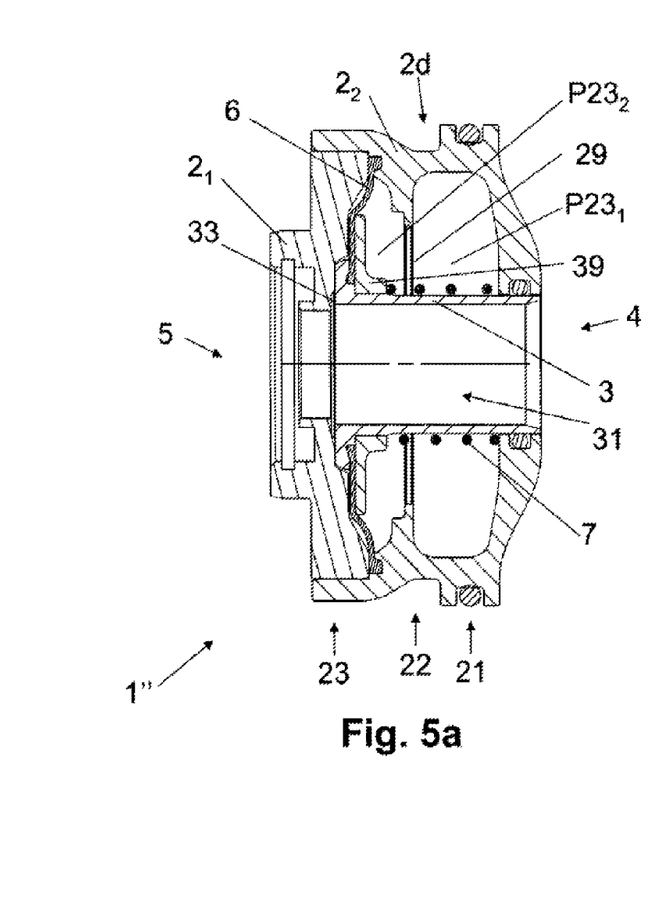
FIG. 5a shows schematically a cross section through a third embodiment of a pressure equalizing insert.
Figure 5B:
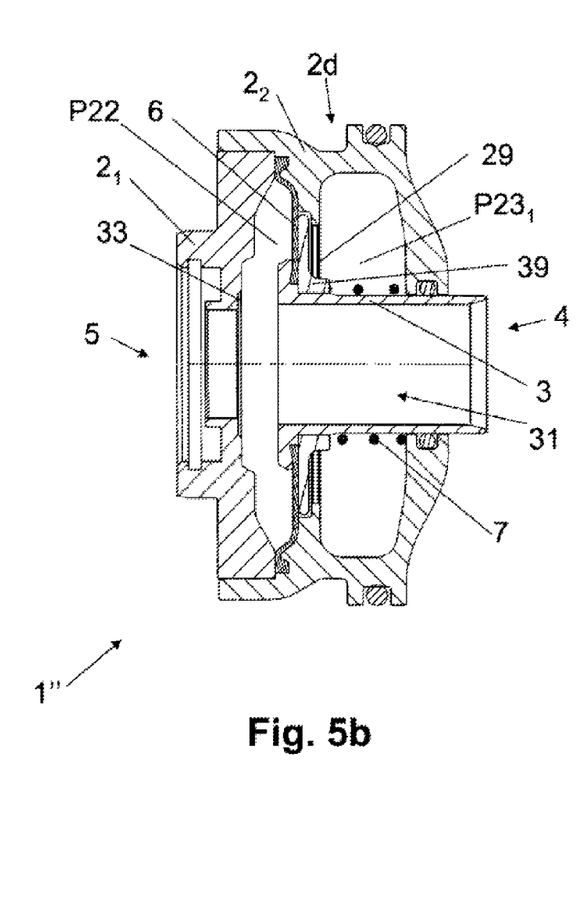
FIG. 5b shows schematically a cross section through a third embodiment of a pressure equalizing insert, wherein the actuating member is displaced relative to the valve seat.

FIG. 5a and FIG. 5b show a third embodiment of a pressure equalizing insert 1", which corresponds essentially to the first embodiment of the pressure equalizing insert 1 described above and differs from it through structural details. The pressure equalizing insert 1" has a two-part housing $2_1$, $2_2$, wherein a first housing part 2 is connected to a second housing $2_2$ by means of a press fit, a screw connection, etc., for example. The membrane 6 on which the actuating member 3 is held is secured between the first housing part $2_1$ and the second housing part $2_2$. In FIG. 5a the pressure equalizing insert 1" is shown in a position in which the actuating member 3 is sealed flush with the housing of the inlet opening 4, while FIG. 5b shows the pressure equalizing insert 1" in a position in which the actuating member 3 protrudes out of the housing at the inlet opening 4.

FIG. 5a in turn corresponds to the position of the actuating member 3, in which a maximum flow is established in cooperation with a valve seat 15, while FIG. 5b corresponds to the position of the actuating member 3 in which this flow-through is minimal.

The fluid region of the housing assigned to the exterior of the pressure equalizing insert 1" diagramed in FIG. 5a comprises two regions $P23_1$, $P23_2$ between which a limiting stop 29 is formed. The limiting stop 29 is formed as a peripheral protrusion on the inside of the second housing part $2_2$, for example. As shown in FIG. 5a, a counterstop 39, which is designed in the form of a disk, for example, is mounted accordingly on the actuating member 3. Therefore, the maximum deflection of the actuating member 3 is limited. The limiting stop 29 and the counterstop 39 thus form a limiting device which prevents the actuating member 3 from damaging a corresponding valve seat 15 of a valve.

Due to the displacement of the actuating member, a distinctly discernible interior fluid region P22 of the housing is formed between the first housing part $2_1$ and the membrane 6 as diagramed schematically in FIG. 5b. This interior fluid region P22 of the housing is practically impossible to see in FIG. 5a because the membrane 6 is in contact with the first housing part $2_1$. Instead of that as shown in FIG. 5a the fluid region of the housing assigned to the exterior has the second region $P23_2$, which is practically impossible to see in FIG. 5b because the counterstop 39 is in contact with the limiting stop 29.

Figure 6:
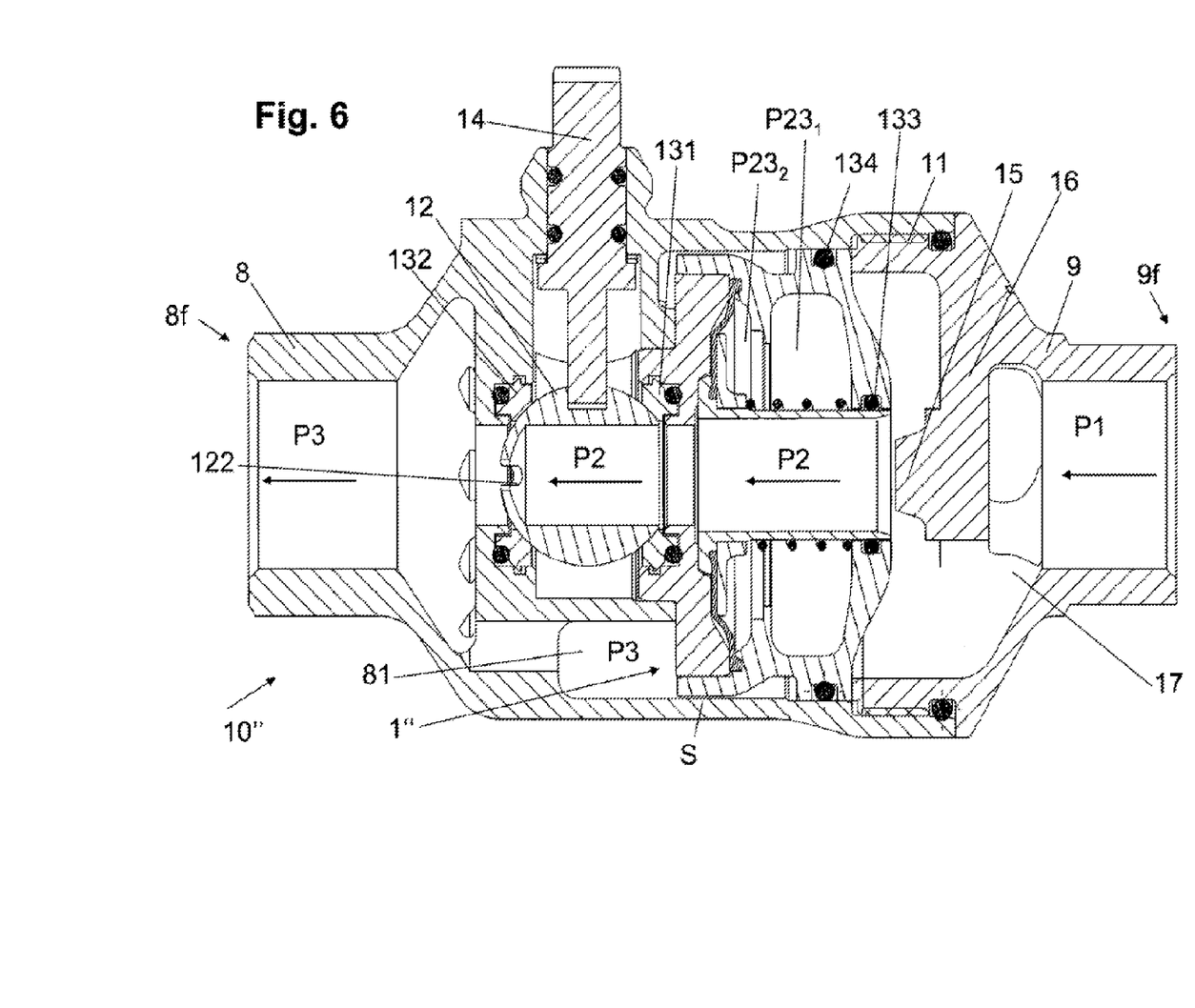
FIG. 6 shows schematically a third embodiment of a valve with an installed third embodiment of a pressure equalizing insert according to the invention.

FIG. 6 shows a third embodiment of a valve 10" with an inserted third embodiment of a pressure equalizing insert 1" which corresponds essentially to the first embodiment of the valve 10 described above and which differs from that in a structural details. The aperture 122 is arranged on the valve element 12 on the outlet end, resulting in the pressure P2 in the actuating member as well as in the valve element 12. After the aperture 122 the result is again the pressure P3 which is guided through the clearance S and the housing openings 2d (not shown in FIG. 6) into the fluid region, which is assigned to the exterior (comprising the regions $P23_1$, $P23_2$ of the housing. The displacement of the actuating member 3 relative to the valve seat 15 results from the difference between the pressure P2 and the pressure P3. This yields an opening between the actuating member 3 and the valve seat 15, which turns out to be larger or smaller according to the difference between the pressure P2 and the pressure P3.

Figure 7:
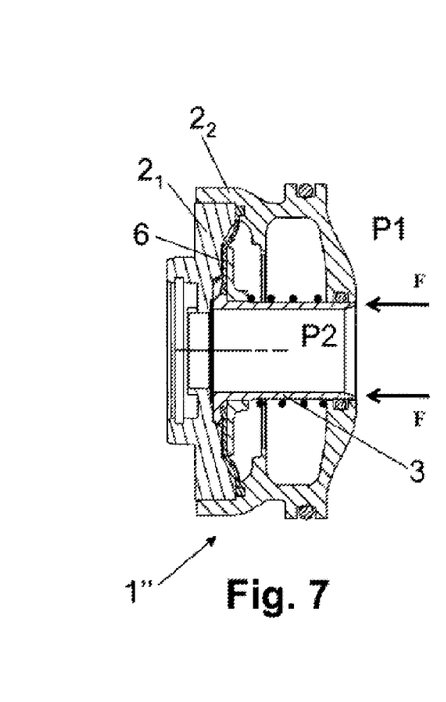
FIG. 7 shows schematically the forces of the pressure equalizing insert acting upon the actuating member according to FIG. 5a and FIG. 5b.

FIG. 7 shows the third embodiment of a pressure equalizing insert 1" as diagramed in FIG. 5a and FIG. 5b. The actuating member 3 is guided in a two-part housing $2_1$, $2_2$. When the fluid enters the actuating member 3, the pressure of the inflowing fluid is reduced from a pressure P1 to a lower pressure P2. As shown in FIG. 7, a force F which depends on the pressure P1 acts on the front end of the actuating member 3 at the inlet end. The force caused by the pressure P2 is automatically compensated by an equally large force on the outlet end of the actuating member 3 and therefore does not play a role.

Figure 8:
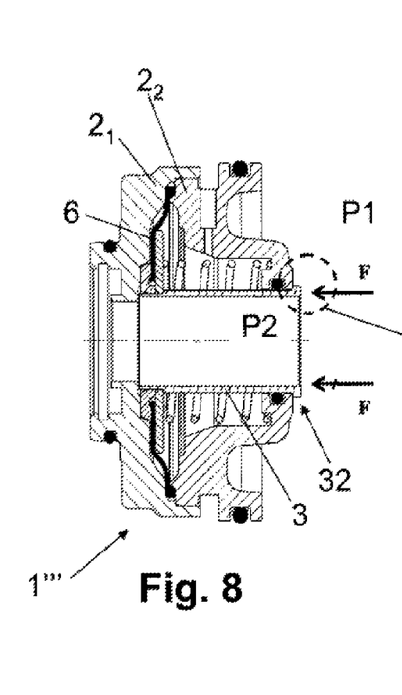
FIG. 8 shows schematically a fourth embodiment of a pressure equalizing insert having a lip-shaped region and FIG. 8a shows schematically a detailed view of the lip-shaped region of the pressure equalizing insert from FIG. 8 with the forces acting thereon.

FIG. 8 shows a fourth embodiment of a pressure equalizing insert 1'''. The actuating member 3 is guided in a two-part housing $2_1$, $2_2$. On entrance of fluid into the actuating member 3, the pressure of the inflowing fluid differs from a pressure P1 at the inlet end to a lower internal pressure P2. As shown in FIG. 8, the actuating member 3 has a lip-shaped region 32. The lip-shaped region 32 is formed on the inlet end of the actuating member 3 and is flange-shaped. An additional force F(P1) acts on the actuating member due to the lip-shaped region 32 on the inlet of the actuating member 3.

Figure 8A:
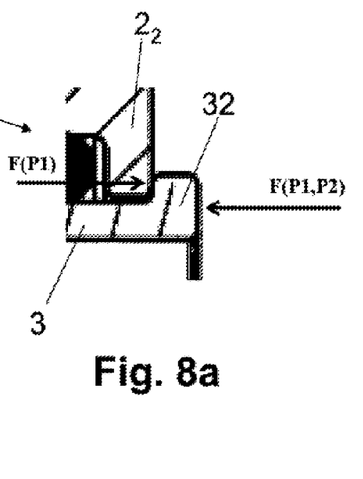

FIG. 8a shows the detail view of the lip-shaped region 32 shown with broken lines in FIG. 8. The force acting on the actuating member 3 is then comprised of the force F(P1, P2) acting in the direction of fluid stream and the force F(P1) acting opposite the direction of the fluid stream. The two forces F(P1, P2) and F(P1) act in opposite directions. The resulting force acting on the actuating member 3 is thus independent of the pressure P1 on the inlet end.

For a valve with an installed fourth embodiment of a pressure equalizing insert 1''' the flow-through and/or the flow rate through the valve is thus also independent of the pressure P1 on the inlet end.

The dimensioning of the lip-shaped region 32 may be different. The lip-shaped region 32 can be formed directly on the end of the actuating member 3 or at a distance from the end of the actuating member 3. The lip-shaped region 32 is designed in the form of a disk or ring, wherein the diameter is larger than the diameter of the actuating member. The diameter of the lip-shaped region 32 is greater for example by the wall thickness of the actuating member 3 than the diameter of the actuating member 3. Other diameters are also possible. If the diameter of the lip-shaped region 32 is only insignificantly greater than the diameter of the actuating member 3, then the resulting force on the actuating member may still be dependent on the pressure P1 on the inlet end. Only when the diameter of the lip-shaped region 32 is much greater than the diameter of the actuating member 3, i.e., for example, greater by the wall thickness, by twice the wall thickness, by three times the wall thickness, etc. of the actuating member 3, only then is the resulting force acting on the actuating member 3 no longer dependent on the pressure P1 on the inlet end.

The dimensions of the lip-shaped region 32 may be determined experimentally, taking into account the following relationships. The pressure P1 at the inlet end may be a great deal than the internal pressure P2 or the external pressure P3. Therefore even a small lip can have a great effect on the flow rate being independent of the pressure P1 on the inlet end. The force F(P1, P2) whose effect is to be compensated as depicted in FIG. 8a, may depend on an oncoming flow geometry inside the valve 10, wherein the size of the lip-shaped region 32 plays practically no role with certain oncoming flow geometries as long as it is not less than a minimum size. In one variant, the effective size of the lip-shaped region 32 is approximately of the order of magnitude of the wall thickness of the actuating member 3.

REFERENCE NOTATION

1 Pressure equalizing insert
2 Housing
$2_1$, $2_2$ First and second housing parts
2d Housing openings
21 First section of the housing
22 Second section of the housing
23 Third section of the housing
P22 Internal fluid region of the housing
P23 Fluid region of the housing assigned to the exterior
$P23_1$, $P23_2$ First and second regions of the fluid region assigned to the exterior
3 Actuating member
31 Setup/equipment of the actuating member for guiding the fluid stream
32 Lip-shaped region of the actuating member
33 Actuating member passages
4 Inlet opening
5 Outlet opening
6 Membrane
7 Spring
8 First valve housing part
8f Flange on the first valve housing part
81 Cavity in the first valve housing part
9 Second valve housing part
9f Flange on the second valve housing part
10 Valve
11 Thread
12 Valve element
121 Passage
122 Aperture
131, 132 Sealing elements
14 Valve actuating element
15 Valve seat
16 Carrier
17 Recesses
P1 Inlet pressure
P2 Internal pressure
P3 External pressure

The invention claimed is:

1. A valve (10) for regulating a fluid stream in particular in an HVAC system, wherein the valve (10) has installed a valve element (12) for regulating the fluid stream, wherein the valve (10) has installed a pressure equalizing insert (1), wherein the pressure equalizing insert (1) is a preassembled module, wherein the pressure equalizing insert (1) comprises a housing (2) having an actuating member (3) displaceably mounted thereon and equipped to at least partially guide the fluid stream regulated by the valve (10), wherein the housing (2) has a first housing part (21) connected to a second housing part (22), wherein a membrane (6) is secured between the first housing part (21) and the second housing part (22), wherein the membrane (6) holds displaceably the actuating member (3), and wherein the actuating member (3) cooperates with a valve seat (15) to regulate the fluid stream as a function of a pressure difference prevailing in the fluid stream, wherein the pressure difference depends on a position of the valve element (12), wherein a first housing part (8) of the valve (10) comprises a first flange (8f) for connecting said valve to a first pipe, and a second housing part (9) of the valve (10) comprises a second flange (9f) for connecting said valve to a second pipe, and wherein said first flange (8f), said second flange (9f) and the pressure equalizing insert (1) are arranged in a coaxial configuration.

2. The valve (10) according to claim 1, characterized in that the actuating member (3) is arranged between an inlet opening (4) and an outlet opening (5) of the housing (2) so that the actuating member (3) is displaced relative to the valve seat (15) in accordance with a pressure difference between the pressure of a fluid stream guided in the pressure equalizing insert (1) and the pressure of a fluid stream guided outside of the pressure equalizing insert (1) for cooperation with the valve seat (15).

3. The valve (10) according to claim 1, characterized in that the actuating member (3) is held displaceably by a membrane (6), wherein the membrane (6) divides a cavity of the housing (2) into an interior fluid region (P22) and a fluid region (P23, P21) assigned to the exterior, wherein the interior fluid region (P22) is fluidically connected to the fluid stream guided by the actuating member (3), wherein the fluid region (P23, P21) assigned to the exterior is fluidically connected to an exterior region of the housing (2), wherein the actuating member (3) is prestressed by a spring element (7) and the prevailing displacement of the actuating member (3) is the result of a pressure difference between a pressure in the interior fluid region (P22) and a pressure in the fluid region (P23, P21) assigned to the exterior.

4. The valve (10) according to claim 1, characterized in that the housing (2) and the actuating member (3) are designed to be cylindrical.

5. The valve (10) according to claim 1, characterized in that the housing (2) has multiple housing parts, which can be connected to one another with one or more connecting devices.

6. The valve (10) according to claim 1, characterized in that one or more limiting devices (29, 39) are arranged to limit the displacement of the actuating member (3) relative to the valve seat (15).

7. The valve (10) according to claim 1, characterized in that a sealing element (133) is mounted on the inlet end between the housing (2) and the actuating member (3).

8. The valve (10) according to claim 1, characterized in that a membrane (6) for holding the actuating member (3) has one or more corrugated embossings.

9. The valve (10) according to claim 1, characterized in that the housing (2) has a first section (21), a second section (22), and a third section (23), wherein the first section (21) is equipped for sealing with respect to a housing of the valve (10), and the third section (23) is equipped to establish a fluid connection in the form of a clearance (S) between the housing (2) of the pressure equalizing insert (1) and the housing of the valve (10), wherein the clearance (S) makes available a fluid connection to a fluid region (P23, P21) assigned to the exterior of the pressure equalizing insert (1).

10. The valve (10) according to claim 1, characterized in that a fluid region (P23) assigned to the exterior of the pressure equalizing insert (1) is fluidically connected to the exterior of the housing (2) via one or more openings (2d) in a wall of the housing (2).

11. The valve (10) according to claim 1, characterized in that a section (21) of the housing (2) of the pressure equalizing insert (1) has on the inlet end a peripheral groove to receive a sealing element (134) which is equipped for sealing with respect to the housing of the valve (10).

12. The valve (10) according to claim 1, characterized in that a section (23) of the housing (2) has on the outlet end an annular groove to receive a sealing insert (131) for the valve element (12) of the valve (10).

13. The valve (10) according to claim 1, characterized in that the actuating member (3) has a lip-shaped region (32) whose dimensions result in the flow-through rate through the valve (10) being independent of the pressure (P1) at the inlet end.

14. The valve (10) according to claim 1, characterized in that a clearance (S) is formed between the housing (2) of the pressure equalizing insert (1) and a housing of the valve (10), said clearance (S) being provided for establishing a fluid connection to a fluid region (P23, P21) assigned to the exterior of the pressure equalizing insert (1) and being designed so that the penetration of dirt into the pressure equalizing insert (1) is reduced and/or a hydraulic damping of the movement of the actuating member (3) of the pressure equalizing insert (1) is induced.

15. The valve (10) according to claim 1, characterized in that a first valve housing part (8) is equipped to accommodate a valve element (12) and the pressure equalizing insert (1), wherein a second valve housing part (9) is equipped for securing the pressure equalizing insert (1) in the first valve housing part (8), wherein the first and second valve housing parts (8, 9) are equipped so that an operative connection (11) can be established between the first and the second valve housing parts (8, 9).

16. The valve (10) according to claim 1, wherein the valve (10) comprises a first valve housing part (8) and a second valve housing part (9), which make up a valve housing, and wherein the first valve housing part (8) is configured to receive said preassembled pressure equalizing insert (1) and the second valve housing part (9) fixes said preassembled pressure equalizing insert (1) in said first valve housing part (8).

* * * * *